United States Patent
Hu et al.

(10) Patent No.: US 8,126,911 B2
(45) Date of Patent: Feb. 28, 2012

(54) SYSTEM AND METHOD FOR CONTENT-BASED PARTITIONING AND MINING

(75) Inventors: Wei Hu, Beijing (CN); Chunrong Lai, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1221 days.

(21) Appl. No.: 10/594,852

(22) PCT Filed: Apr. 27, 2006

(86) PCT No.: PCT/CN2006/000829
§ 371 (c)(1),
(2), (4) Date: Sep. 29, 2006

(87) PCT Pub. No.: WO2007/124616
PCT Pub. Date: Nov. 8, 2007

(65) Prior Publication Data
US 2009/0228685 A1 Sep. 10, 2009

(51) Int. Cl.
*G06F 7/00* (2006.01)
(52) U.S. Cl. .......................................... 707/776; 706/45
(58) Field of Classification Search ................... 707/776
See application file for complete search history.

(56) References Cited

U.S. PATENT DOCUMENTS

| | | | | |
|---|---|---|---|---|
| 4,876,643 A * | 10/1989 | McNeill et al. | | 710/110 |
| 5,799,311 A * | 8/1998 | Agrawal et al. | | 1/1 |
| 5,897,638 A * | 4/1999 | Lasser et al. | | 1/1 |
| 6,032,146 A * | 2/2000 | Chadha et al. | | 707/737 |
| 6,138,117 A * | 10/2000 | Bayardo | | 1/1 |
| 6,230,151 B1 * | 5/2001 | Agrawal et al. | | 706/12 |
| 6,332,160 B1 * | 12/2001 | Tabuchi | | 709/224 |
| 6,665,669 B2 | 12/2003 | Han et al. | | |
| 6,675,164 B2 * | 1/2004 | Kamath et al. | | 1/1 |
| 6,816,867 B2 * | 11/2004 | Jevons et al. | | 1/1 |
| 6,826,556 B1 * | 11/2004 | Miller et al. | | 707/764 |
| 6,829,608 B2 * | 12/2004 | Ma et al. | | 707/776 |
| 6,941,303 B2 * | 9/2005 | Perrizo | | 1/1 |
| 7,007,035 B2 * | 2/2006 | Kamath et al. | | 1/1 |
| 7,016,887 B2 * | 3/2006 | Stockfisch | | 706/45 |
| 7,174,343 B2 * | 2/2007 | Campos et al. | | 707/737 |
| 7,328,218 B2 * | 2/2008 | Steinberg et al. | | 1/1 |
| 7,430,643 B2 * | 9/2008 | Jordan et al. | | 711/150 |
| 7,433,879 B1 * | 10/2008 | Sharma et al. | | 1/1 |

(Continued)

OTHER PUBLICATIONS

Han et al., "Mining Frequent Patterns without Candidate Generation: A Frequent-Pattern Tree Approach, Data Mining and Knowledge Discovery," Jan. 2004, Springer Netherlands, vol. 8, No. 1, pp. 53-87.*

(Continued)

*Primary Examiner* — Robert Timblin
*Assistant Examiner* — Richard Bowen
(74) *Attorney, Agent, or Firm* — Blakely, Sokoloff, Taylor & Zafman LLP

(57) ABSTRACT

Methods and systems are provided for partitioning data of a database or data store into several independent parts as part of a data mining process. The methods and systems use a mining application having content-based partitioning logic to partition the data. Once the data is partitioned, the partitioned data may be grouped and distributed to an associated processor for further processing. The mining application and content-based partitioning logic may be used in a computing system, including shared memory and distributed memory multi-processor computing systems. Other embodiments are described and claimed.

8 Claims, 10 Drawing Sheets

U.S. PATENT DOCUMENTS

2003/0028531 A1  2/2003  Han et al.
2007/0143759 A1* 6/2007  Ozgur et al. .................. 718/102

OTHER PUBLICATIONS

Wang et al., "Closet+: Searching for the Best Strategies for Mining Frequent Closed Itemsets," 2003, ACM, Session: Research track, pp. 236-245.*

Dehao Chen; Chunrong Lai; Wei Hu; WenGuang Chen; Yimin Zhang; Weimin Zheng; , "Tree partition based parallel frequent pattern mining on shared memory systems," Parallel and Distributed Processing Symposium, 2006. IPDPS 2006. 20th International , vol. No. pp. 8 pp. Apr. 25-29, 2006.*

Ruoming Jin; Ge Yang; Agrawal, G.; , "Shared memory parallelization of data mining algorithms: techniques, programming interface, and performance," Knowledge and Data Engineering, IEEE Transactions on , vol. 17, No. 1, pp. 71-89, Jan. 2005.*

M.J. Zaki, C.-T. Ho and R. Agrawal, "Parallel Classification for Data Mining on Shared-Memory Multiprocessors," Proc. IEEE Int'l Conf. Data Eng., pp. 198-205, May 1999.*

Agrawal, Rakesh , "Fast Algorithms for Mining Association Rules", *IBM Almaden Research Center*, 32 pages.

Han, Jaiwei , "Mining Frequent Patterns without Candidate Generation", *Simon Fraser University*, 12 pages.

Jin, Ruoming , "Shared Memory Parallelization of Data Mining Algorithms: Techniques, Programming Interface, and Performance", *IEEE Transactions, vol. 16, No. 10*, (Oct. 2004), 19 pages.

Pramudiono, Iko , "Tree Structure Based Parallel Frequent Pattern Mining on PC Cluster", *University of Tokyo*. 10 pages.

Zaiane, Osmar S., "Fast Parallel Association Rule Mining Without Candidacy Generation", *University of Alberta*. 4 pages.

First Office Action for Chinese Patent Application No. 200680054391.9 dated Dec. 21, 2010, 7 pgs.

International Search Report and Written Opinion mailed Feb. 8, 2007 for Int'l Patent Application No. PCT/CN2006/000829.

Second Chinese Office Action mailed May 31, 2011 for Chinese Patent Application No. 2006 80054391.9.

* cited by examiner

SYSTEM AND METHOD FOR CONTENT-BASED PARTITIONING AND MINING

BACKGROUND

Given modern computing capabilities, it is relatively easy to collect and store vast amounts of data, such as facts, numbers, text, etc. The issue then becomes how to analyze the vast amount of data to determine important data from less important data. The process of filtering the data to determine important data is often referred to as data mining. Data mining refers to a process of collecting data and analyzing the collected data from various perspectives, and summarizing any relevant findings. Locating frequent itemsets in a transaction database has become an important consideration when mining data. For example, frequent itemset mining has been used to locate useful patterns in a customer's transaction database.

Frequent Itemset Mining (FIM) is the basis of Association Rule Mining (ARM), and has been widely applied in marketing data analysis, protein sequences, web logs, text, music, stock market, etc. One popular algorithm for frequent itemset mining is the frequent pattern growth (FP-growth) algorithm. The FP-growth algorithm is used for mining frequent itemsets in a transaction database. The FP-growth algorithm uses a prefix tree (termed the "FP-tree") representation of the transaction database, and is faster than the other mining algorithms, such as the Apriori mining algorithm. The FP-growth algorithm is often described as a recursive elimination scheme.

As part of a preprocessing step, the FP-growth algorithm deletes all items from the transactions that are not individually frequent according to a defined threshold. That is, the FP-growth algorithm deletes all items that do not appear in a user-specified minimum number of transactions. After preprocessing, a FP-tree is built, then the FP-growth algorithm constructs a "conditional pattern base" for each frequent item to construct a conditional FP-tree. The FP-growth algorithm then recursively mines the conditional FP-tree. The pattern growth is achieved by the concatenation of the suffix pattern with the frequent patterns generated from the conditional FP-tree.

Since the FP-growth algorithm has been recognized as a powerful tool for frequent itemset mining, there has been a large amount of research in efforts to implement the FP-growth algorithm in parallel processing computers. There have been two main approaches to implement FP-growth: the multiple tree approach and single tree approach. The multiple tree approach builds multiple FP-trees separately, which results in the introduction of many redundant nodes. FIG. 6 illustrates the multiple nodes generated by the conventional multiple tree approach with 1, 4, 8, 16, 32 and 64 threads (trees). The example database used to generate FIG. 6 is a benchmark dataset "accidents", which can be found at the link "http://fimi.cs.helsinki.fi/data/" (the minimal support threshold is 200,000). As shown, the multiple tree approach will generate two (2) times as many tree nodes on four (4) threads, and about nine (9) times as many tree nodes on sixty-four (64) threads, as compared to only one thread. The shortcoming of building redundant nodes in multiple trees results in great memory demand, and sometimes the memory is not large enough to contain the multiple trees. The previous single approach builds only a single FP-tree in memory, but it needs to generate one lock that is associated with each of the tree nodes, thereby limiting scalability.

DETAILED DESCRIPTION

Figure 1:
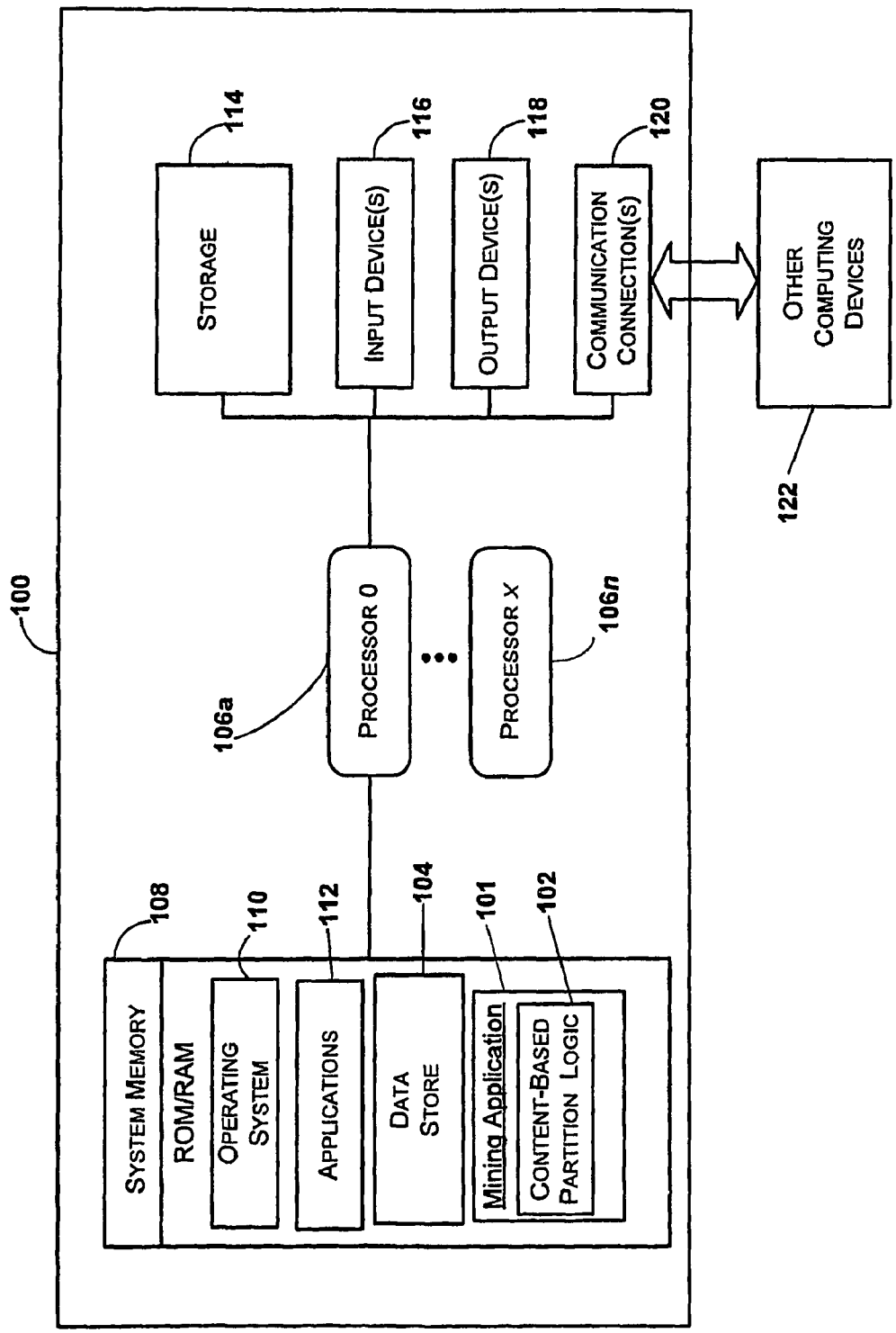
FIG. 1 is a block diagram of a computing device including a mining application having content-based partitioning functionality, according to an embodiment.

Embodiments of methods and systems provide for partitioning data of a database or data store into several independent parts as part of a data mining process. The methods and systems use content-based partitioning logic to partition the data by building a probe structure. In an embodiment, the probe structure includes a probe tree and associated probe table. Once the data is partitioned, according to content for example, the resulting parts may be grouped and distributed to an associated processor for further processing. The content-based partitioning logic may be used in a computing system, including shared memory and distributed memory multi-processor computing systems, but is not so limited.

As described above, after the data is partitioned into independent parts or branches (e.g. disjoint sub-branches), each branch or group of branches may then be assigned to a processor (or thread) for further processing. In an embodiment, after scheduling by a master thread, each transaction is distributed to a corresponding processor to finish building a specific branch of the FP-tree. According to the FP-growth algorithm the data dependency only exists within each sub-branch, and there is no dependency between the sub-branches. Thus many of the locks required in conventional single tree methodologies are unnecessary. Under an embodiment, a database is partitioned based on the content of transactions in a transaction database. The content-based partitioning saves memory, and eliminates many locks when building the FP-tree. The memory savings are based on a number of factors, including the characteristics of the database, the support threshold, and the number of processors. The techniques described herein-provide an efficient and valuable tool for data mining using multi-core and other processing architectures.

In an embodiment, a master/slave processing architecture is used to efficiently allocate processing operations to a number of processors (also referred to as "treads"). The master/slave architecture includes a master processor (master thread), and any remaining processors (threads) are designated as slave processors (slave threads) when building the FP-tree. One of the tasks of the master thread is to load a transaction from a database, prune the transaction, and distribute the pruned transaction to each of the slave threads for a parallel build of the FP-tree. Each slave thread has its own transaction queue and obtains a pruned transaction from the queue each time the master thread assigns a pruned transaction to an associated slave thread. Each slave thread disposes of its pruned transaction to build the FP-tree. This architecture allows the master thread to do some preliminary measures of the transaction before delivering it to a slave thread. According to the results of the preliminary measures, the master thread may also decide how to distribute the transaction to a particular thread. In alternative embodiments, all threads operate independently to build the FP-tree using the probe structure.

In the following description, numerous specific details are introduced to provide a thorough understanding of, and enabling description for, embodiments of the systems and methods. One skilled in the relevant art, however, will recognize that these embodiments may be practiced without one or more of the specific details, or with other components, systems, etc. In other instances, well-known structures or operations are not shown, or are not described in detail, to avoid obscuring aspects of the disclosed embodiments.

FIG. 1 illustrates a computing device 100 including a mining application 101 having content-based partition logic 102 which interacts with a data store (or database) 104 when performing data mining operations, according to an embodiment. The mining application 101 and content-based partition logic 102 is described below in detail. The computing device 100 includes any computing system, such as a handheld, mobile computing system, a desktop computing system, laptop computing system, and other computing systems. The computing device 100 shown in FIG. 1 is referred to as a multi-processor or multi-core device since the architecture includes multiple processors 106a-106x. Tasks may be efficiently distributed among the processors 106a-106x so as not to overwhelm an individual processor. In other embodiments, the computing device 100 may include a single processor and other components. The computing device 100 typically includes system memory 108.

Depending on the configuration and type of computing device, system memory 108 may be volatile (such as random-access memory (RAM) or other dynamic storage), non-volatile (such as read-only memory (ROM), flash memory, etc.), or some combination.

The system memory 108 may include an operating system 110 and one or more applications/modules 112. Computing device 100 may include additional computer storage 114, such as magnetic storage devices, optical storage devices, etc. Computer storage includes, but is not limited to, RAM, ROM, electrically erasable programmable read-only memory (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which may be used to store information. Computing device 100 may also include one or more input devices 116 and one or more output devices 118. Computing device 100 may also contain communication connections 120 that allow the computing device 100 to communicate with other computing devices 122, processors, and/or systems, such as over a wired and/or wireless network, or other network.

Figure 2A:
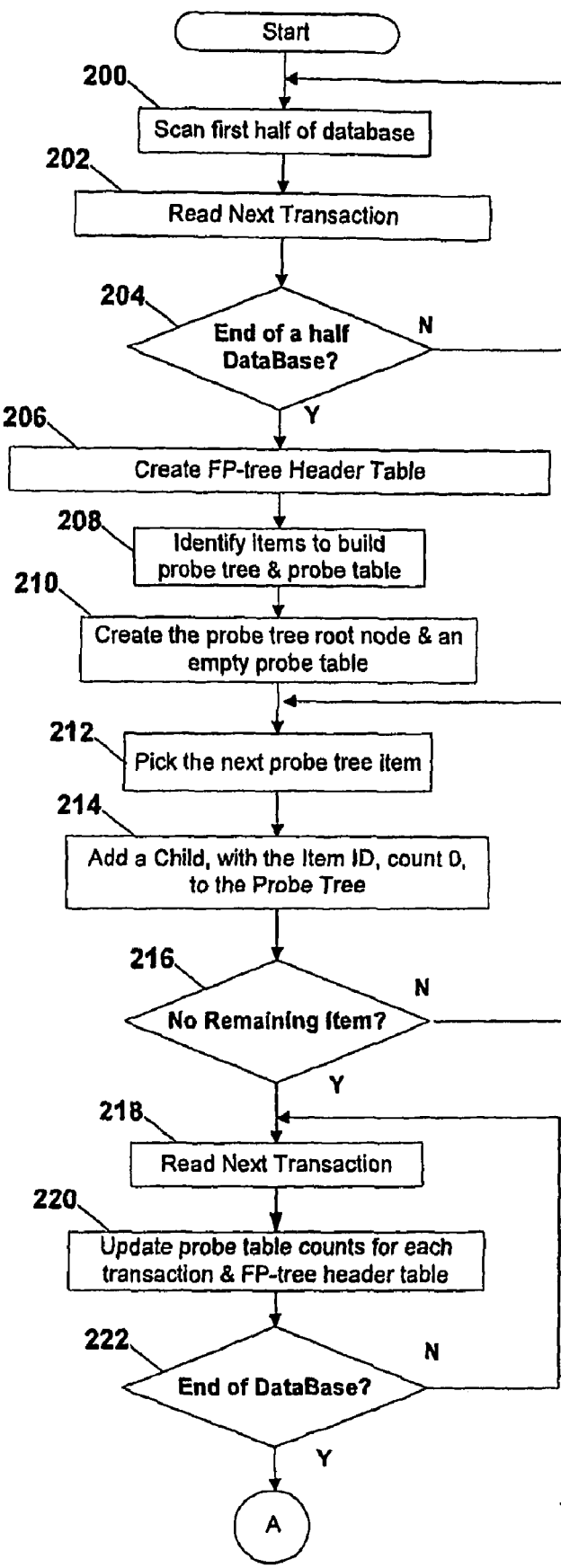
FIGS. 2A-2B depict a flow, diagram which illustrates various logical operations by content-based partition logic, according to an embodiment.
Figure 2B:
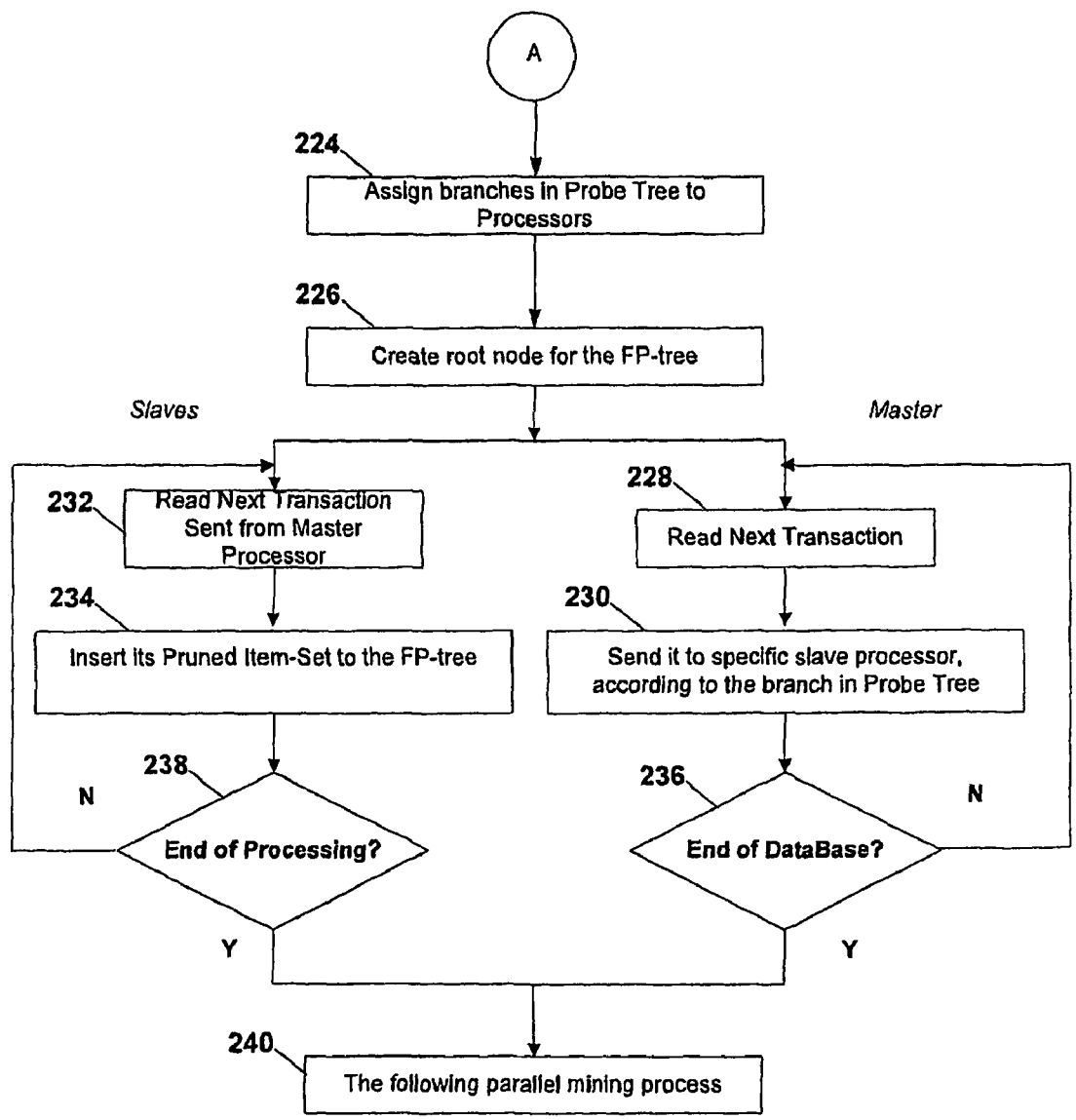

FIGS. 2A-2B depict a flow diagram which illustrates various logical operations of the mining application 101 including the content-based partition logic 102, according to an embodiment. For this embodiment, processor 106a (referred herein as the master processor) executes the mining application 101 including the content-based partition logic 102, as described below. The transaction database of Table 1 below is used in conjunction with the flowchart to provide an illustrative example using the mining application 101 and content-based partition logic 102. For example, each transaction in Table 1 may represent a sequence of items, such as items purchased as part of a web-based transaction, wherein each item of the transaction is represented by a unique letter.

TABLE 1

| Transaction Number | Transaction |
|---|---|
| 1 | A, B, C, D, E |
| 2 | F, B, D, E, G |
| 3 | A, B, F, G, D |
| 4 | B, D, A, E, G |
| 5 | B, F, D, G, K |
| 6 | A, B, F, G, D |
| 7 | A, R, M, K, O |
| 8 | B, F, G, A, D |
| 9 | A, B, F, M, O |
| 10 | A, B, D, E, G |
| 11 | B, C, D, E, F |
| 12 | A, B, D, E, G |
| 13 | A, B, F, G, D |
| 14 | B, F, D, G, R |
| 15 | A, B, D, F, G |
| 16 | A, R, M, K, J |
| 17 | B, F, G, A, D |
| 18 | A, B, F, M, O |

At 200, the mining application 101 uses the content-based partitioning logic 102 and begins by scanning the first half of a transaction database, such as the transaction database in Table 1, to determine frequent items based on a defined support threshold. Different support thresholds may be implemented depending on a particular application. For this example, the support threshold is 12. At 202, each transaction of the first half of the transaction database is scanned and the number of times that each item occurs in the scan is counted, under an embodiment. Since the search covers half of the transaction database, a support threshold of six (6) is used to create the header table for the FP-tree based on the scan of the first half of the database. At 204, it is determined if the first half of the database has been scanned. If not, the flow returns to 200, and the next transaction is read. If the first half of the database has been scanned at 204, then the logic 102, at 206, creates a header table for the frequent items that meet the minimum support threshold based on the scan of the first half of the transaction database.

The logic 102 also assigns an ordering to the frequent items identified in the first scan. In an embodiment, the logic 102 orders the frequent items according to an occurrence frequency in the transaction database. For this example, the logic 102 orders the most frequent items as B then A then D then F then G ($B \geq A \geq D \geq F \geq G$). This ordering is used to create the header table and probe structure, described below. For this example, scanning the first half of the transaction database has resulted in the identification of various items which are inserted into the header table (Table 2). As shown below, after the initial scan of the first half of the transaction database, the header table includes the identified frequent items: item B occurring eight (8) times, item A occurring seven (7) times, item D occurring seven (7) times, item F occurring six (6) times, and item G occurring six (6) times.

TABLE 2

| Item | Count |
|---|---|
| B | 8 |
| A | 7 |
| D | 7 |
| F | 6 |
| G | 6 |

At 208, the logic 102 identifies frequent items which are used to build a probe structure. In an embodiment, the logic 102 identifies frequent items which are used to build a probe structure, including a probe tree and associated probe table, described below. For this example, items B, A, D, and F are identified as items to be used in building a probe tree. At 210, logic 102 creates a root node of the probe tree and begins building an empty probe table. At 212, the logic 102 begins building the probe tree from the root node using the first most frequent item in the transaction database from the identified frequent items B, A, D, and F. At 214, the logic 102 adds a child with its item identification (ID) to the probe tree. While building the probe tree, the logic 102 begins filling in an empty probe table (e.g. counts are set to zero shown below). As described above, the probe tree is built by evaluating the identified frequent items. At 216, the logic 102 determines if there are any remaining frequent items to evaluate. If there are remaining items, the flow returns to 212 and continues as described above. If there are no remaining items, the flow proceeds to 218.

Figure 3:
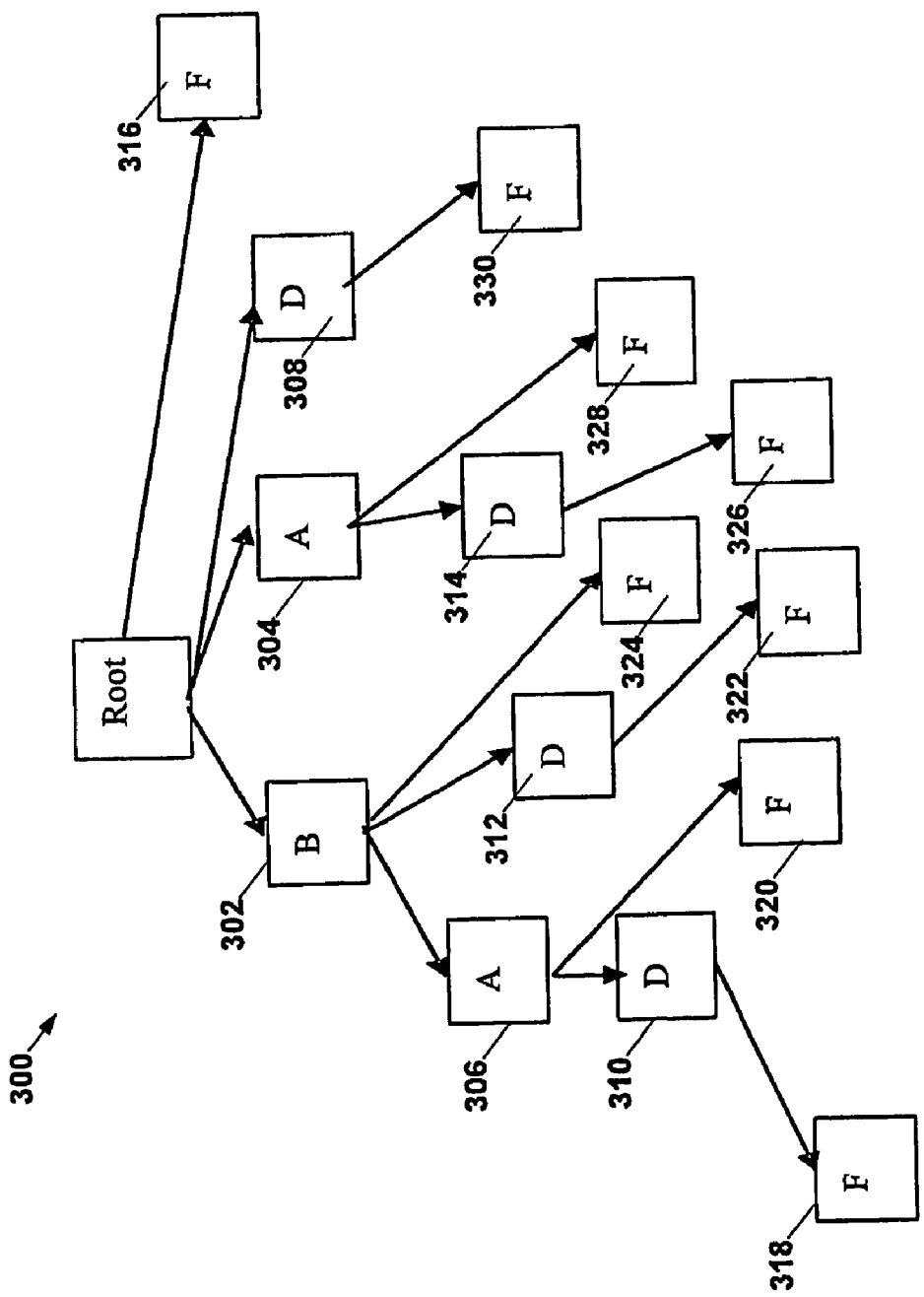
FIG. 3 represents a probe tree data structure, under an embodiment.

FIG. 3 represents a probe tree data structure (or probe tree) 300 which includes the identified items resulting from steps 208-216. A more detailed description of the probe tree and probe table build follows. According to an embodiment, the logic 102 selects the first "M" identified frequent items to build the probe tree and associated probe table. As a result the probe tree and associated probe table include $2^M$ branches. In experiments, M=10 is a sound choice for many cases. As described below, the $2^M$ branches may be further grouped to obtain substantially equal groups or chunks for further processing.

For this example, the probe tree 300 is a representation of the identified frequent items (e.g. B, A, D, F (M=4)) and their transactional relationship to one another in accordance with the occurrence frequency and content. For the first most frequent item, B, the logic 102 creates node 302 which corresponds to the most frequent item B. The logic 102 takes the next most frequent item, A, and creates node 304 corresponding to frequent item A. The logic 102 also creates block 306 which shows that A is a "child" of B. Since A is only a child of B, the logic 102 takes the next most frequent items D, creating node 308 corresponding to the next most frequent item. The logic 102 also creates blocks 310, 312, and 314, based on the determination that D is a child of B and A for each instance of B and A in the probe tree 300.

For the least most frequent item of this example, F, the logic 102 creates node 316 which corresponds to the frequent item, F. The logic 102 also creates blocks 318, 320, 322, 324, 326, 328, and 330, illustrating that F is a child of B, A, and D for each instance of B, A, and D in the probe tree 300. The corresponding probe table (Table 3) is shown below for the identified frequent items B, A, D, and F. At this point, logic 102 sets the count for each item to zero, but is not so limited. Each row of the probe table (Table 3) represents a content-based transaction including one or more of the identified frequent items B, A, D, and F. The number "1" is used to represent an occurrence of a specific item in a transaction including the one or more frequent items, whereas the number "0" is used to represent one or more items that do not occur in an associated transaction.

TABLE 3

| B | A | D | F | Count |
|---|---|---|---|-------|
| 1 | 1 | 1 | 1 | 0 |
| 1 | 1 | 1 | 0 | 0 |
| 1 | 1 | 0 | 1 | 0 |
| 1 | 1 | 0 | 0 | 0 |
| 1 | 0 | 1 | 1 | 0 |

TABLE 3-continued

| B | A | D | F | Count |
|---|---|---|---|-------|
| 1 | 0 | 1 | 0 | 0 |
| ... | | | | |
| 0 | 1 | 0 | 0 | 0 |
| ... | | | | |
| 0 | 0 | 0 | 0 | 0 |

With continuing reference to FIG. 2, after creating the probe tree and empty probe table, the flow proceeds to 218, where the logic 102 continues the first scan by evaluating the next transaction of the transaction database. For this embodiment, the logic 102 scans the second half of the transaction database (transactions 10-18), evaluating each respective transaction. At 220, based on the scanned transactions, the logic 102 provides counts in the probe table and updates the header table for the frequent items that meet the minimum support threshold. The updated probe table (Table 5) is shown below. At 222, if there are no further transactions in the transaction database, the flow proceeds to 224. Otherwise, if there are further transactions to process, the flow returns to 218. Based on the ordering of the identified frequent items above (B≧A≧D≧F≧G), the logic 102 updates the header table (Table 4 below).

TABLE 4

| Item | Count |
|------|-------|
| B | 16 |
| A | 14 |
| D | 14 |
| F | 12 |
| G | 12 |

The updated probe table is shown below (Table 5), including the count field resulting from the scan of the second half of the transaction database. Each count represents the number of transactions which contain the respective identified frequent items after scanning the second half of the transaction database. Table 5 represent the content-based transactions after the first scan of the transaction database.

TABLE 5

| B | A | D | F | Count |
|---|---|---|---|-------|
| 1 | 1 | 1 | 1 | 3 |
| 1 | 1 | 1 | 0 | 2 |
| 1 | 1 | 0 | 1 | 1 |
| 1 | 1 | 0 | 0 | 0 |
| 1 | 0 | 1 | 1 | 2 |
| 1 | 0 | 1 | 0 | 0 |
| ... | | | | |
| 0 | 1 | 0 | 0 | 1 |
| ... | | | | |
| 0 | 0 | 0 | 0 | 0 |

At 224, each transaction or probe tree branch, including one or more identified frequent items, may be assigned to one or more processors for further conditioning. The probe tree and probe table may be described as a preprocessing of the transaction data which operates to partition the transaction data for data mining. According to an embodiment, the probe table may be used to balance the processing load by identifying a transaction that consists, of one or more items, wherein each transaction includes a unique itemset. More particularly, as described below, the logic 102 attempts to balance the workload, determined by the content of a particular transaction and the associated transaction count as identified by using the probe table and probe tree.

Based on a review of the probe table, there are three (3) transactions that include the identified frequent items B, A, D, and F. There are two (2) transactions that include the identified frequent items B, A, and D, but not F. There is one transaction that includes the identified frequent items B, A, and F, but not D. There are no transactions that include only the identified frequent items B and A. There are two (2) transactions that include the identified frequent items B, D, and F, but not A. There is one transaction that includes the identified frequent item A. The remaining transactions of the probe table may be determined in a similar manner. As described below, there are fewer locks associated with the nodes of the probe tree. Note that in the conventional single tree approach, each FP-tree node requires a lock. Since the probe tree does not require as many locks, a system using the probe tree functionality has increased scalability.

The updated probe table may be used to construct the frequent-pattern tree (FP-tree) by assigning transaction chunks to respective processors (such as 106a-106x), so that the individual processors each build a respective part of the FP-tree (a parallel build process). A grouping algorithm, described below, may be used to group branches of the probe tree into N groups, where N is the number of available processors or threads. A group of branches may then be assigned to a respective processor. The probe tree and probe table provide an important tool for balancing the computational load between multiple processors when mining data, including building of the FP-tree.

Under an embodiment, the mining application 101 assigns a group of transactions to a particular thread, so that each thread may process approximately the same number of transactions. The assignment of groups to the processors results in minimal conflicts between these processing threads. As described below, a heuristic algorithm may be used to group the branches of the probe table (e.g. represented by the counts of each row) into a number of approximately equal groups which correspond to the number of processors used to build the FP-tree and perform the data mining operations.

For example, assume that the computing device 100 includes four processors 106a-106d. According to an embodiment, one processor, such as processor 106a, is assigned as the master processor, and remaining processors, such as 106b-106d are assigned as slave processors. The master processor 106a reads each transaction and assigns each transaction to a particular slave processor to build the FP-tree. At 226, a root node is created for the FP-tree. At 228, the master processor 106a, using the mining application 101, scans the transaction database once again, starting with the first transaction.

At 230, the master processor 106a distributes each transaction to a specific slave processor. At 232, each slave processor reads each transaction sent by the master processor 106a. At 234, each slave processor inserts its pruned-item set into the full FP-tree. At 236, the mining application 101 determines whether each transaction of the full database has been read and distributed. If each transaction of the full database has been read and distributed, the flow proceeds to 240 and the mining application 101 begins mining the FP-tree for frequent patterns. If each transaction of the full database has not been read and distributed, the flow returns to 228. If there are no more transactions to process, the flow continues to 240, otherwise the flow returns to 232.

The distribution and parallel build of the FP-tree is shown in FIGS. 4A-4D. As described above, a heuristic algorithm may be used to group the transactions of the probe tree into substantially equal groupings for processing by the four processors (the three slave processors build respective parts of the FP-tree). For this example, the mining application 101 uses the heuristic algorithm to group the branches of the probe tree into three groups since there are three slave processors. According to an embodiment, the heuristic algorithm assumes that Vi is a vector which contains all chunks that belong to group i. Ci is the number of transactions of group i (the size of Vi). The goal is to distribute the transactions into (T−1) groups, making the total number of transactions in every group approximately equivalent.

The algorithm may be formalized as follows:

$$V = \{V_1, V_2, \ldots, V_{T-1}\}$$

$$f = \sum_{i=1}^{T-1}\left(Ci - \frac{\sum_{j=1}^{T-1} Cj}{T-1}\right)^2$$

The goal is to find V to minimize f T input is P={P1, P2, ..., Pm}. The output is V={$V_1, V_2, \ldots, V_{T-1}$}.
That is, for each $P_i$:
Find j, Cj=min (Ck, k=1, 2, ..., T−1)
Vj=Vj U chunk i
Cj=Cj+sizeof (chunk i)
Return V.

Consequently, after using the heuristic algorithm, the first group includes the three (3) transactions that contain the items B, A, D, and F. The second group includes the two (2) transactions with items B, A and D, but without item F, and the one (1) transaction with items B, A, and F, but without item D (total of three (3) transactions). The third group includes the two (2) transactions with item B, D and F, but without item A, and the one (1) transaction with item A, but without items B, D, and F (total of three (3) transactions). There are no counts for other branches in the probe tree (see the probe table), so the logic 102 only assigns groups of the above five (5) branches based on the results of the heuristic algorithm. Based on the description above, the master processor 106a assigns the first group to the first slave processor 106b, the second group to the second slave processor 106c, and the third group to the third slave processor 106d for a parallel build of the FP-tree.

Figure 4A:
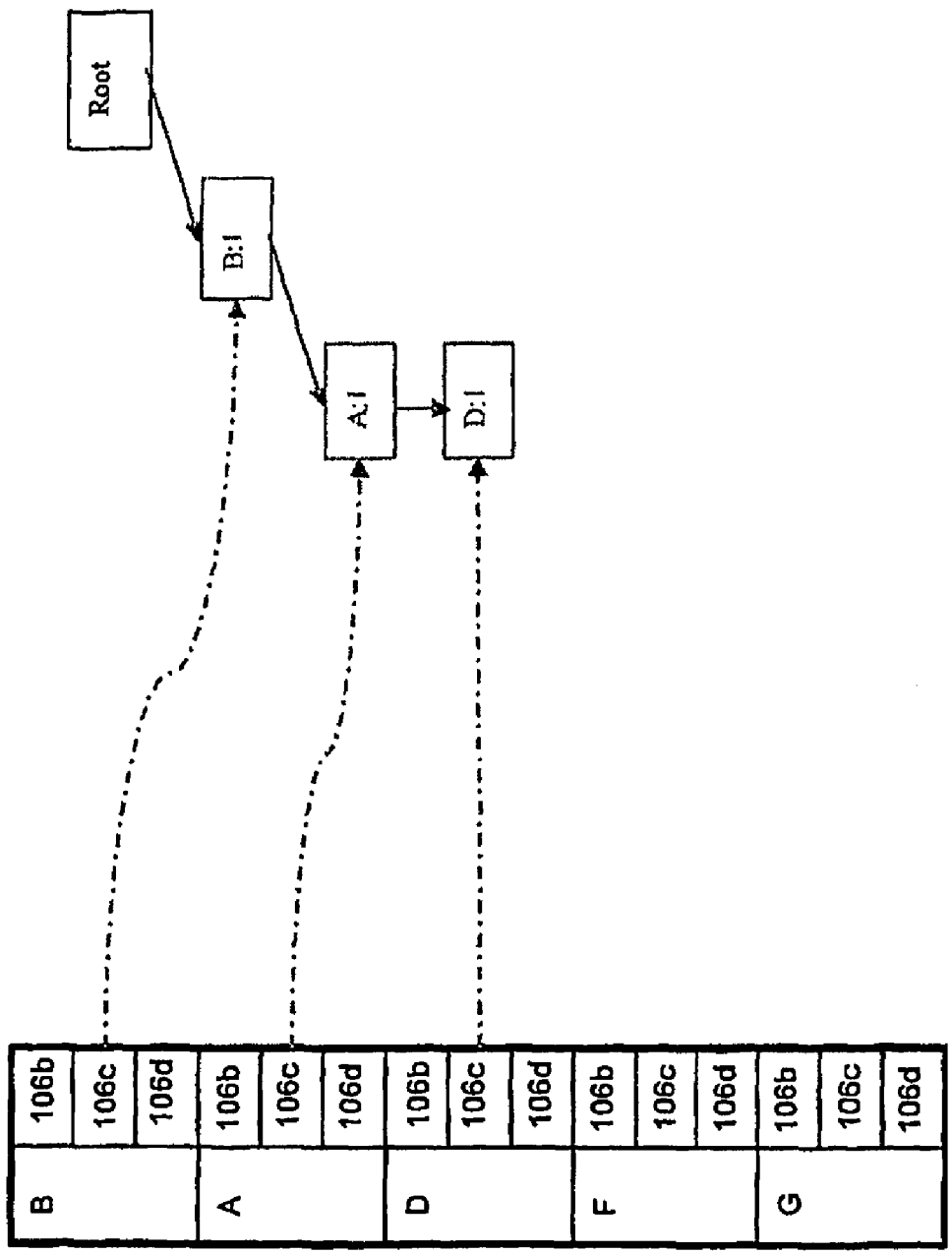
FIGS. 4A-4D illustrate the first steps in a parallel build of a frequent pattern (FP) tree, according to an embodiment.

FIGS. 4A-4D illustrate the first steps in a parallel build of the FP-tree by the three slave processors 106b-106d. After the header table and root node of the FP-tree are built as described above, the master-processor 106a reads the first transaction (A, B, C, D, E), pruning it to (B, A, D) according to the header table content. The master processor 106a, for this example, assigns (B, A, D) to slave processor 106c according to the grouping based on the heuristic algorithm, probe tree, and probe table described above. As shown in FIG. 4A, after receiving the pruned items (B, A, D), slave processor 106c sequentially creates nodes B, A, and D. The slave processor 106c sets the corresponding node links (shown as dotted lines) for slave processor 106c and also sets each node count to one (1).

Figure 4B:
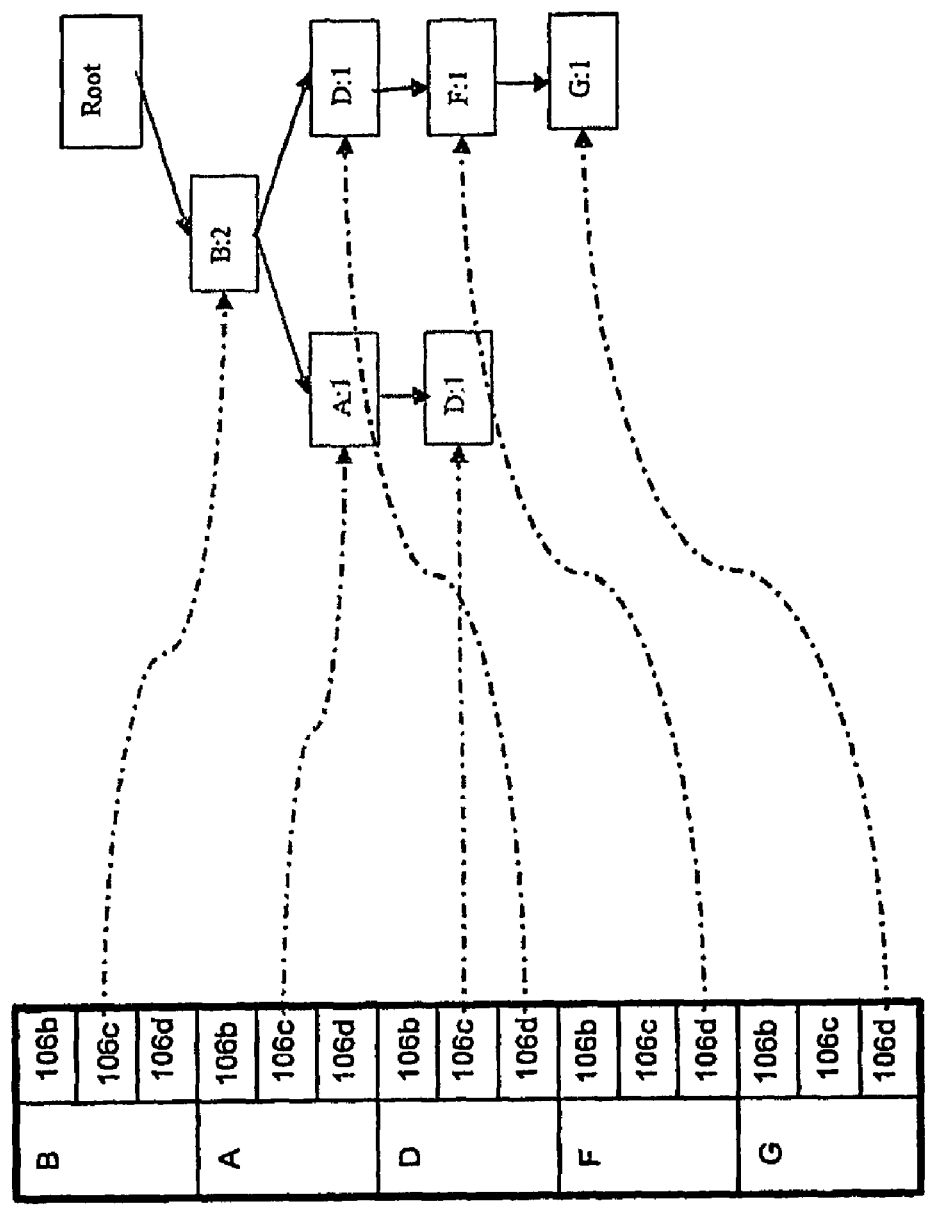
Figure 4C:
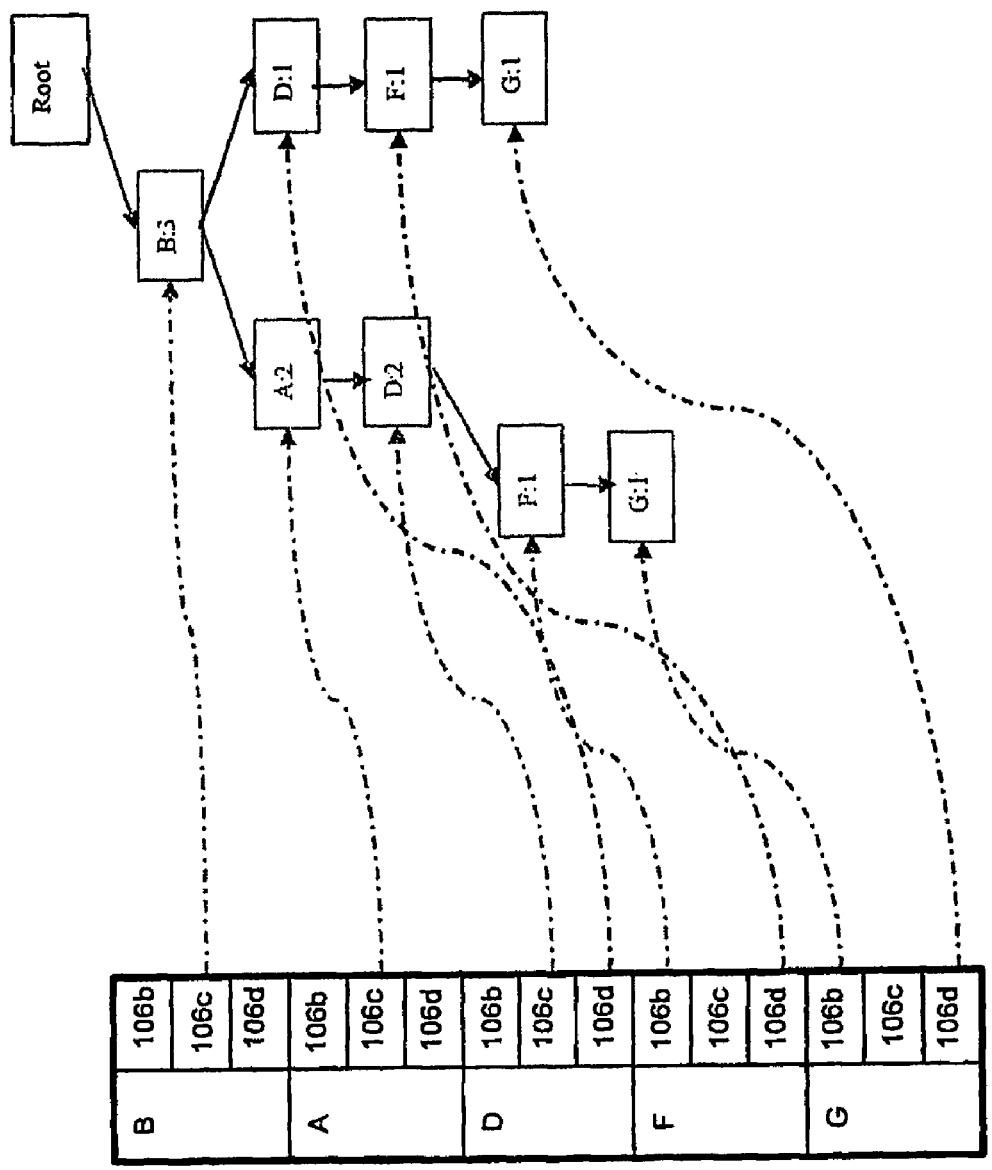
Figure 4D:
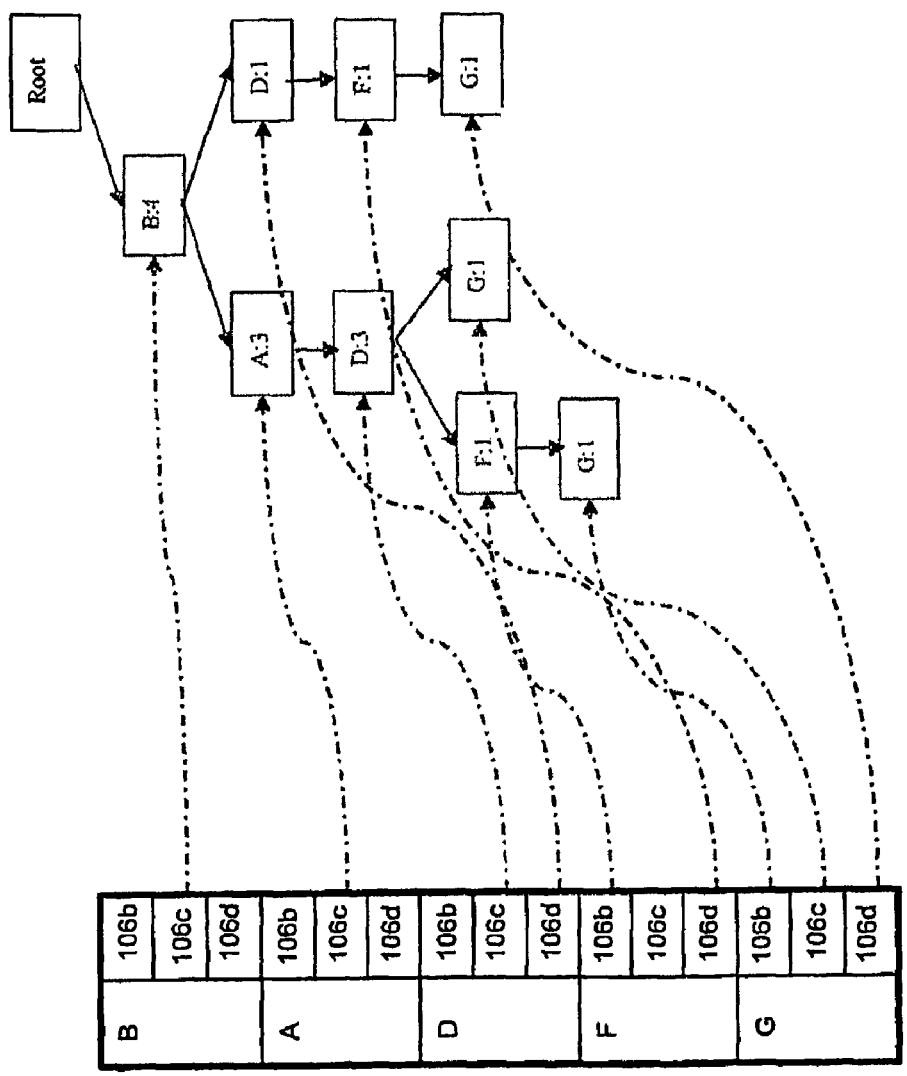

The master processor 106a reads the second transaction (F, B, D, E, G), pruning it to (B, D, F, G) according to the header table content. The master processor 106a then assigns (B, D, F, G) to slave processor 106d. Thereafter, as shown in FIG. 4B, slave processor 106d inserts the pruned transaction (B, D, F, G) into the FP-tree by sequentially creating nodes D, F and G as shown in FIG. 4B. The slave processor 106d sets the corresponding node links, sets the node count equal to one (1) for D, F, and G, while incrementing the node count for B by one (1). The master processor 106a reads the third transaction (A, B, F, G, D), pruning it to (B, A, D, F, G) according to the header table content. The master processor 106a then assigns the pruned transaction (B, A, D, F, G) to slave processor 106b. Thereafter, slave processor 106b inserts the pruned transaction (B, A, D, F, G) into the FP-tree by sequentially creating nodes F and G and setting the corresponding node links as shown in FIG. 4C. The slave processor 106b sets the node count equal to one (1) for F and G, while incrementing the node count by one (1) for nodes B, A, and D in the common path.

The master processor 106a reads the fourth transaction (B, D, A, E, G), pruning it to (B, A, D, G) according to the header table content. The master processor 106a then assigns the pruned transaction (B, A, D, G) to slave processor 106c. Thereafter, slave processor 106c inserts the pruned transaction (B, A, D, G) into the FP-tree by creating node G and setting the corresponding node links as shown FIG. 4D. The slave processor 106c sets the node count equal to one (1) for node G, while incrementing the node count by one (1) for B, A, and D in the common path. The master processor 106a continues scanning the transaction database, assigning each transaction to respective slave processors as described above. Each slave processor inserts the pruned transactions into the FP-tree until the full FP-tree is built including the representative links and node counts, as described above. In an embodiment, when creating the FP-tree, the multiple processors may not access a node with a lock while processing different transactions. Accordingly, the locks prevent multiple threads from attempting to create a duplicate node in the FP-tree. In an embodiment, the FP-tree is built from and saved to system memory 108. In another embodiment, the FP-tree is built from and saved to a distributed memory system.

After the FP-tree is built, the FP-tree may be mined for specific patterns with respect to the identified frequent items. The FP-tree may be mined using various data mining algorithms. For example, conditional (pre-fix) based mining operations may be performed using the FP-tree. The mining of the FP-tree according to an embodiment may be summarized as follows. Each processor may be used to independently mine a frequent item of the FP-tree. For each frequent item, the mining process constructs a conditional pattern base" (e.g. a "sub-database" which consists of the set of prefix paths in the FP-tree co-occurring with the suffix pattern.

After constructing the conditional FP-tree, the conditional FP-tree is recursively mined according to the identified frequent items. As described above, content-based partitioning logic 102 is used to partition data of a database or data store into several independent parts for subsequent distribution to the one or more processors. The content-based partitioning logic 102 is used is to partition the database equally so that the load is balanced when building and mining the FP-tree (e.g. each processor gets an approximately equal amount of transactions to process), but is not so limited.

Another example illustrates the use of the mining application 101 including the content-based partitioning logic 102. Assume that a database contains eight (8) items (A, B, C, D, E, F, G, H). For this example, the database includes a total of eighty (80) transactions. After examining a first part of the database, such as the first half for example, it is determined that items A, B, and C are the first three (3) most frequent items in the first part of the database. Next, the transactions may be partitioned according to the content of the first M most frequent items. As described above, M may be heuristically determined, based in part, on the number of available processors. For the present example, M is set equal to three (M=3), since there are 3 most frequent items. Thus, the transactions may be partitioned into $2^M$ or eight (8) content-based chunks according to items A, B, and C, A content-based chunk is equal to a sub-branch in an FP-tree. Table 6 below provides an example of the distribution of transactions (e.g. 101 means the associated chunk includes transactions having items A and C, but not B).

TABLE 6

| ABC | Transaction count |
|-----|-------------------|
| 111 | 14 |
| 110 | 12 |
| 101 | 10 |
| 100 | 6 |
| 011 | 4 |
| 010 | 5 |
| 001 | 5 |
| 000 | 24 |

Figure 5:
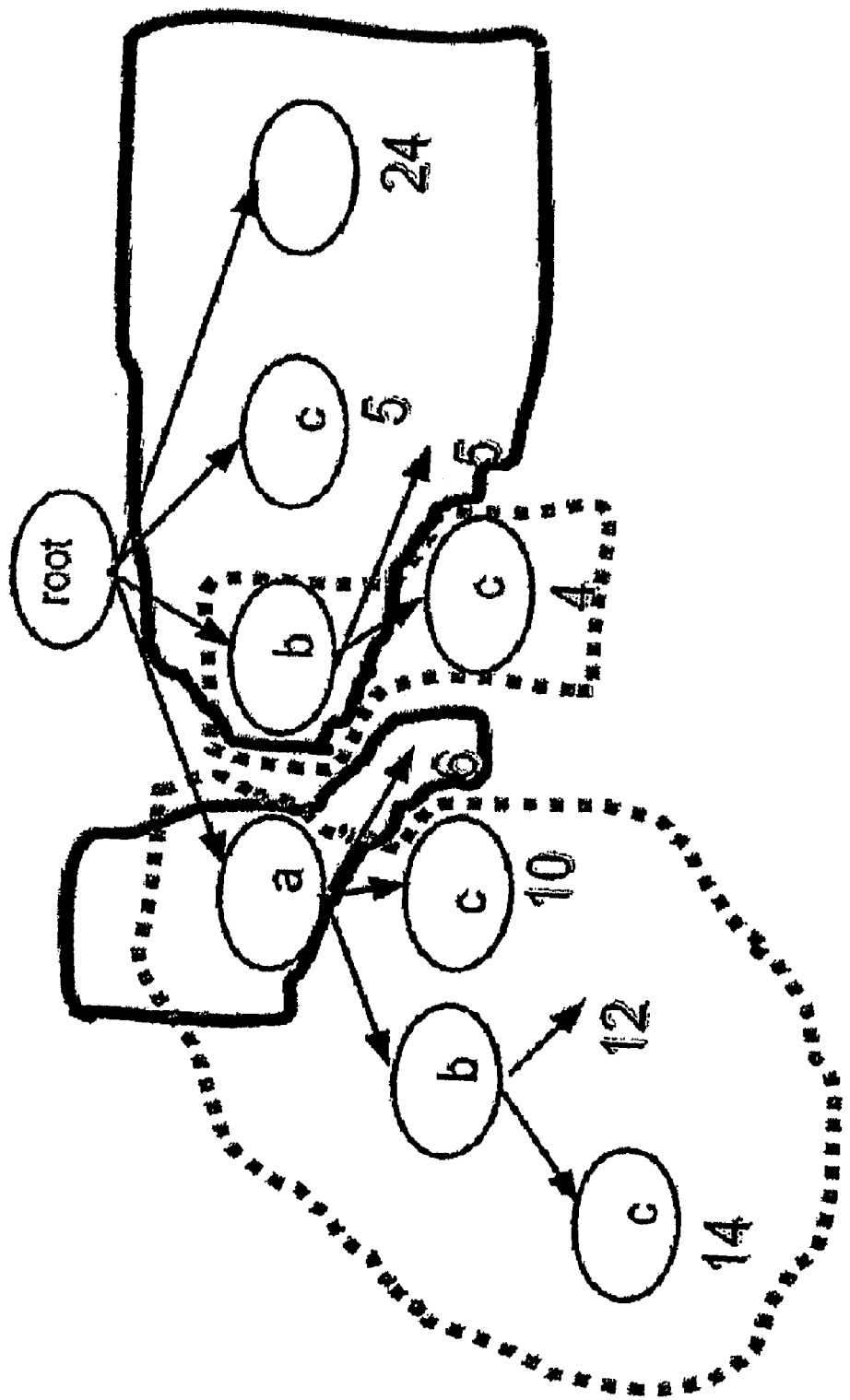
FIG. 5 depicts partitioned sub-branches and a grouping result for a probe tree, according to an embodiment.
Figure 6:
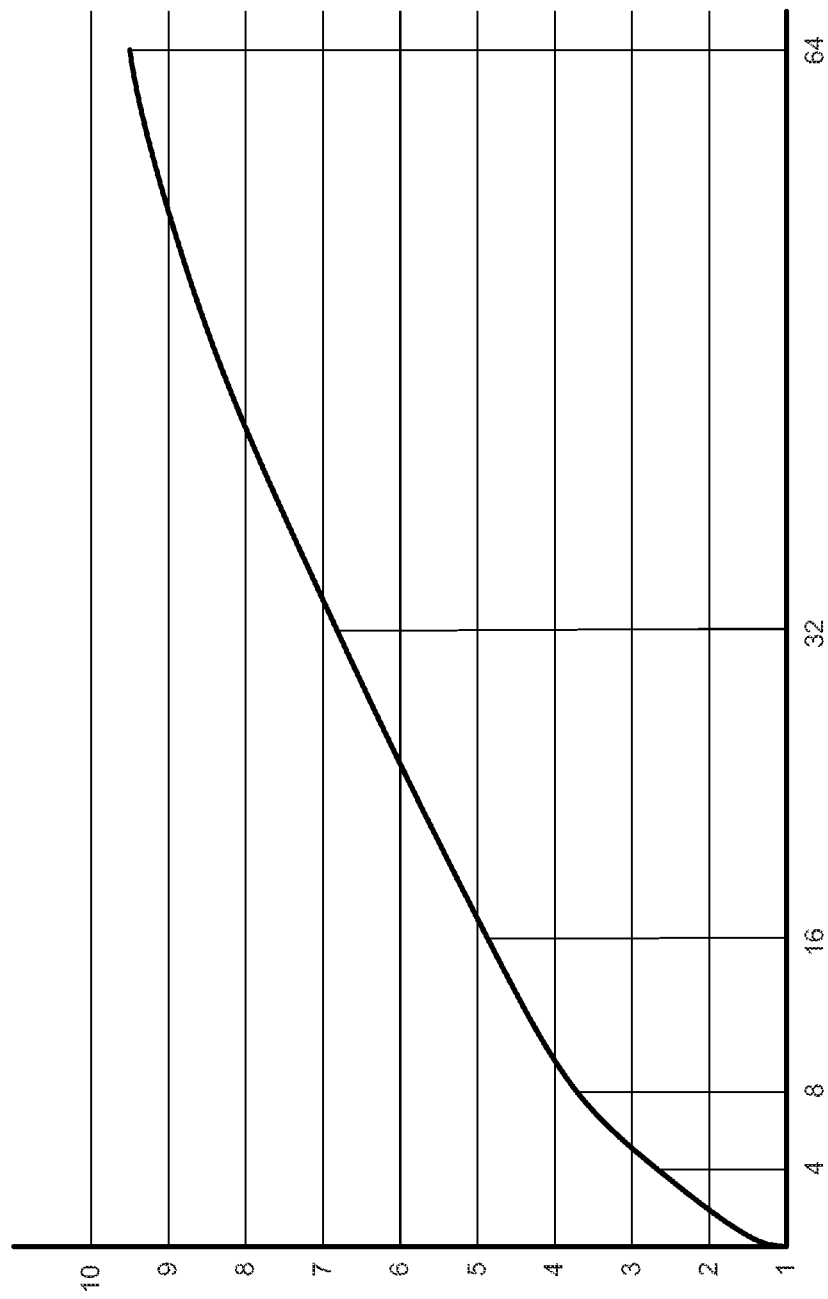
FIG. 6 illustrates the multiple nodes generated by a conventional multiple tree approach with 1, 4, 8, 16, 32 and 64 threads (trees).

Assuming two available slave threads, the content-based partition logic 102 groups the eight chunks into two groups, one for each slave thread. As described above, a heuristic search algorithm may be used to group the eight chunks into two groups, wherein each group contains about the same number of transactions. The two resulting groups may include the first group of chunks {111, 110, 101, 011} and the second group of chunks {100, 010, 001, 000}, wherein each group contains forty (40) transactions. FIG. 5 depicts the partitioned sub-branches and grouping result. The two sub-branches circled with dashed lines represent a first group of chunks assigned to the first thread. The two other sub-branches circled with solid lines represent the second group of chunks assigned to the second thread.

The equal numbers of transactions processed by each thread results in an efficient balance of the load when building the FP-tree. Additionally, after the partitioning using the probe tree, only eight (8) ($2^3$) locks are required for the possible shared nodes (e.g. only consisting of a, b, c in the FP-tree) in the parallel tree-building process. Compared to the 256 ($2^8$)=256 locks for a conventional build. Thus, the pre-partitioning results in a large reduction in the amount of locks (e.g. power(2, items_num)–power(2, N)). Furthermore, the content-based partitioning may not require a duplication of nodes as in the conventional multiple tree approach. Accordingly, the content-based partitioning and grouping results in a good load balance among threads, while providing high scalability.

Table 7 below provides experimental results based on a comparison of the content-based tree partition and multiple tree approach. The test platform was a 16-processor shared-memory system. The test benchmark databases "accidents" may be downloaded directly from the link "http://fimi.cs.helsinki.fi/data/", and the databases "bwebdocs" and "swebdocs" were cut from the database "webdocs."

TABLE 7

| | Database | 1P | 2P | 4P | 8P | 16P |
|---|----------|------|------|------|------|------|
| Multiple tree | swebdocs | 1102 | 613 | 359 | 197 | 125 |
| | bwebdocs | 278 | 155 | 92.7 | 52.8 | 42.9 |
| | accidents | 23.2 | 14.1 | 8.44 | 6.62 | 4.95 |
| Tree partition | swebdocs | 1031 | 539 | 330 | 187 | 120 |
| | bwebdocs | 278 | 155 | 92.5 | 53.7 | 40.2 |
| | accidents | 22.3 | 14.3 | 8.78 | 6.20 | 5.29 |

Table 7 shows the running time for the whole application, including the first scan, the tree construction procedure and the mining stages. Table 8 below shows the running times of the mining stage for each approach on all three benchmark databases.

TABLE 8

| | Database | 1P | 2P | 4P | 8P | 16P |
|---|---|---|---|---|---|---|
| Multiple tree | swebdocs | 1087 | 603 | 350 | 187 | 113 |
| | bwebdocs | 258 | 134 | 73.5 | 32.7 | 19.9 |
| | accidents | 20.3 | 11.8 | 6.44 | 4.35 | 2.95 |
| Tree partition | swebdocs | 1018 | 527 | 320 | 176 | 110 |
| | bwebdocs | 250 | 129 | 70.6 | 31.9 | 17.8 |
| | accidents | 18.0 | 10.5 | 5.63 | 2.66 | 1.44 |

As shown in Tables 7 and 8 above, it is seen that the tree partition approach has a comparable performance with the old multiple tree approach in total running time, and a little better in just the mining stage. The results are reasonable: in first and second stages the tree partition approach does additional partitions for each transaction based on its content. However, the tree partition approach should be a little faster in the mining stage, since there are no duplicated tree nodes.

Aspects of the methods and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Implementations may also include microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. Of course the underlying device technologies may be, provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

The term "processor" as generally used herein refers to any logic processing unit, such as one or more central processing units ("CPU"), digital signal processors ("DSP"), application-specific integrated circuits ("ASIC"), etc. While the term "component" is generally used herein, it is understood that "component" includes circuitry, components, modules, and/or any combination of circuitry, components, and/or modules as the terms are known in the art.

The various components and/or functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples for, the systems and methods are described herein for illustrative purposes, various equivalent modifications are possible, as those skilled in the relevant art will recognize. The teachings provided herein may be applied to other systems and methods, and not only for the systems and methods described above. The elements and acts of the various embodiments described above may be combined to provide further embodiments. These and other changes may be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. Accordingly, the inventors reserve the right to add additional claims after filing the application to pursue such additional claim forms for other aspects as well.

What is claimed is:

1. A method for mining data of a database, comprising:
   identifying transaction items of the database and determining an occurrence frequency for each item, wherein determining the occurrence frequency includes:
   scanning a first portion of the database;
   identifying transaction items of the first portion of the database with an occurrence frequency at least equal to a threshold value;
   scanning a second portion of the database; and
   identifying transaction items of the second portion of the database with an occurrence frequency at least equal to the threshold value;
   locking the identified transaction items to prevent other data mining processes from selecting the identified transaction items;
   building a probe structure based on the identified frequent transaction items with an occurrence frequency at least equal to twice the threshold value;
   building a plurality of disjoint branches for the probe structure, wherein each branch of the probe structure includes a number of identified transaction items selected based on content of the transaction items and the occurrence frequency of the transaction items, at least two branches includes a common transaction item, and each of the plurality of disjoint branches are capable of being executed independently from the other plurality of disjoint branches;
building a frequent pattern tree (FP-tree) from the branches of the probe structure;
grouping the branches of the FP-tree into a plurality of groups, the grouping based on the content of the transaction items of each branch, wherein the number of transactions in each of the plurality of groups is substantially equal; and
assigning, via a master processor, each group of branches of the FP-tree to one of a plurality of slave processors, the plurality of slave processors to execute the transaction items identified by the respective branch in parallel with each other, wherein the number of transaction items to be executed by each of the plurality of slave processors is substantially equal.

2. The method of claim 1, further comprising building the probe structure to include a probe tree and probe table, and using the probe tree and probe table to build the FP-tree for mining the FP-tree to determine frequent data patterns.

3. The method of claim 1, further comprising partitioning the database according to content of the identified transaction items to obtain the probe structure, wherein the probe structure includes combinations of the identified transaction items and the number of occurrences of one or more content-based transactions.

4. A computer-readable non-transitory storage medium having stored thereon instructions, which when executed in a system operate to manage data of a database by:
identifying transaction items of the database and determining an occurrence frequency for each item, wherein determining the occurrence frequency includes:
scanning a first portion of the database;
identifying transaction items of the first portion of the database with an occurrence frequency at least equal to a threshold value;
scanning a second portion of the database; and
identifying transaction items of the second portion of the database with an occurrence frequency at least equal to the threshold value;
locking the identified transaction items to prevent other data mining processes from selecting the identified transaction items;
building a probe structure based on the identified frequent transaction items with an occurrence frequency at least equal to twice the threshold value;
building a plurality of disjoint branches for the probe structure, wherein each branch of the probe structure includes a number of identified transaction items selected based on content of the transaction items and the occurrence frequency of the transaction items, at least two branches includes a common transaction item, and each of the plurality of disjoint branches are capable of being executed independently from the other plurality of disjoint branches;
building a frequent pattern tree (FP-tree) from the branches of the probe structure;
grouping the branches of the FP-tree into a plurality of groups, the grouping based on the content of the transaction items of each branch, wherein the number of transactions in each of the plurality of groups is substantially equal; and
assigning, via a master processor, each group of branches of the FP-tree to one of a plurality of slave processors, the plurality of slave processors to execute the transaction items identified by the respective branch in parallel with each other, wherein the number of transaction items to be executed by each of the plurality of slave processors is substantially equal.

5. The computer-readable non-transitory storage medium of claim 4, wherein the instructions, which when executed in a system operate to manage data of a database further by building the probe structure to include a probe tree and probe table, and using the probe tree and probe table to build the FP-tree for mining the FP-tree to determine frequent data patterns.

6. A system comprising:
a master processor;
a plurality of slave processors;
a database; and
software to
identify transaction items of the database and determine an occurrence frequency for each item, wherein determining the occurrence frequency includes:
scanning a first portion of the database;
identifying transaction items of the first portion of the database with an occurrence frequency at least equal to a threshold value;
scanning a second portion of the database; and
identifying transaction items of the second portion of the database with an occurrence frequency at least equal to the threshold value;
lock the identified transaction items to prevent other data mining processes from selecting the identified transaction items;
build a probe structure based on the identified frequent transaction items with an occurrence frequency at least equal to twice the threshold value;
build a plurality of disjoint branches for the probe structure, wherein each branch of the probe structure includes a number of identified transaction items selected based on content of the transaction items and the occurrence frequency of the transaction items, at least two branches includes a common transaction item, and each of the plurality of disjoint branches are capable of being executed independently from the other plurality of disjoint branches;
build a frequent pattern tree (FP-tree) from the branches of the probe structure;
group the branches of the FP-tree into a plurality of groups, the grouping based on the content of the transaction items of each branch, wherein the number of transactions in each of the plurality of groups is substantially equal; and
assign, via a master processor, each group of branches of the FP-tree to one of a plurality of slave processors, the plurality of slave processors to execute the transaction items identified by the respective branch in parallel with each other, wherein the number of transaction items to be executed by each of the plurality of slave processors is substantially equal.

7. The system of claim 6, the software to further
build the probe structure to include a probe tree and probe table, and
use the probe tree and probe table to build the FP-tree for mining the FP-tree to determine frequent data patterns.

8. The system of claim 6, the software to further partition the database according to content of the identified transaction items to obtain the probe structure, wherein the probe structure includes combinations of the identified transaction items and the number of occurrences of one or more content-based transactions.

* * * * *